United States Patent [19]
Schniers

[11] 3,731,805
[45] May 8, 1973

[54] ONE-TANK SAFETY FUEL RESERVE
[75] Inventor: Robert C. Schniers, Flint, Mich.
[73] Assignee: General Motors Corporation, Detroit, Mich.
[22] Filed: Aug. 13, 1971
[21] Appl. No.: 171,618

[52] U.S. Cl. .....................210/86, 210/172, 73/311, 73/313
[51] Int. Cl. ...............................................B01d 29/42
[58] Field of Search.........................210/86, 104, 172

[56] References Cited

UNITED STATES PATENTS 1,329,074   1/1920   Fehan...............................210/172 X
3,023,905   3/1962   McDougal et al....................210/172
3,266,312   8/1966   Coleman et al. .......................73/313

Primary Examiner—John Adee
Attorney—S. Carter et al.

[57] ABSTRACT

A tank discharge and indicating unit having means to indicate when a liquid in a tank, such as a gasoline tank on an automobile, reaches a reserve level and means to permit transfer of the reserve fuel from the tank. Such a unit will be very useful in automobile gas tanks whereby the driver will become aware immediately that he is on low fuel, and can through the means of my invention switch to a reserve supply.

4 Claims, 1 Drawing Figure

Patented May 8, 1973
3,731,805
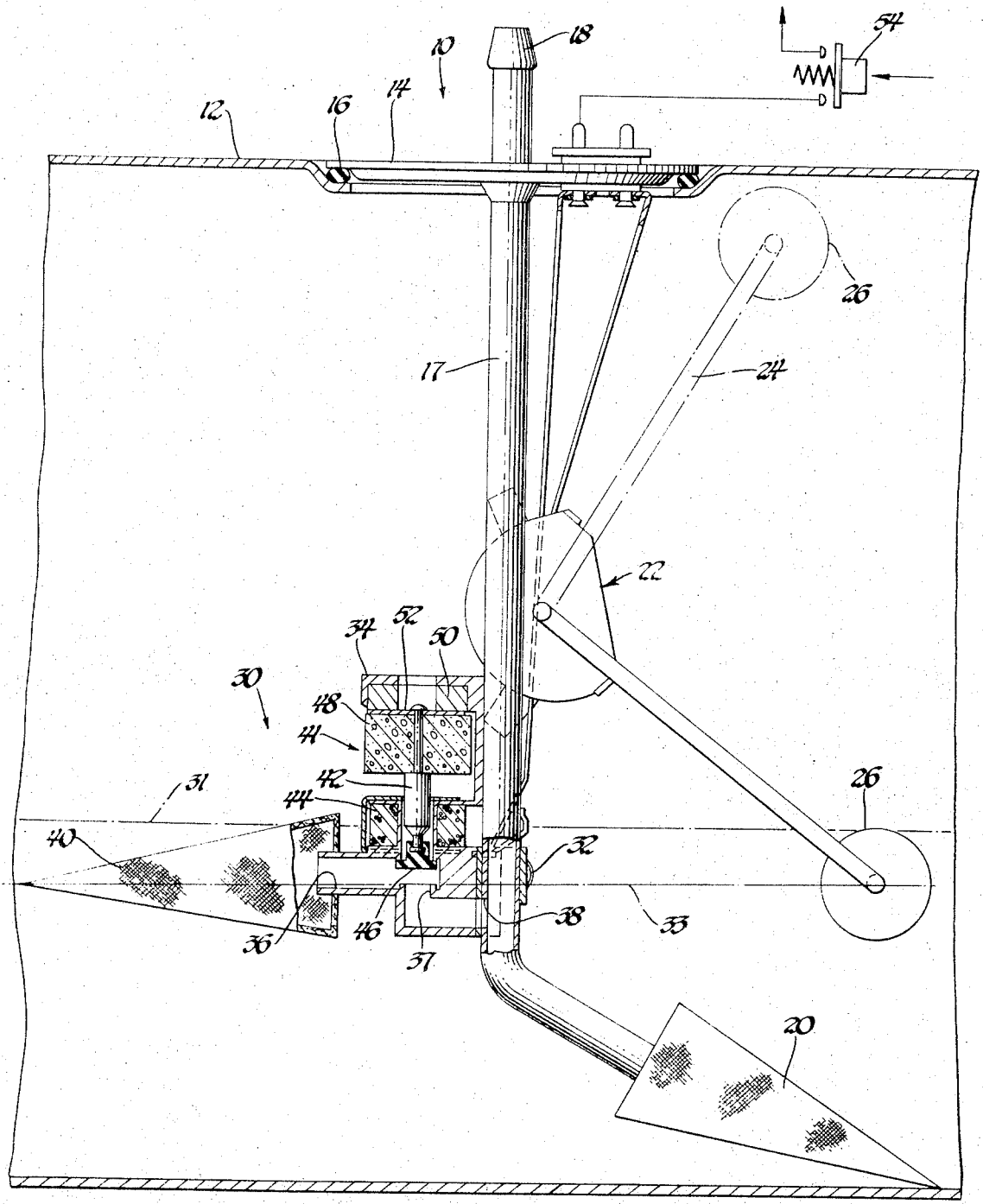
INVENTOR.
Robert C. Schniers
BY
P. A. Faucher
ATTORNEY

ONE-TANK SAFETY FUEL RESERVE

In this day of high speed freeway travel in air-conditioned, stereo equipped cars, people can become lax in not checking their gas gauges. As a precaution against the drive of an automobile running completely out of gas, I have provided an invention that can be readily adapted to the tank indicating unit presently used. My invention will provide an indication that reserve fuel is being used as well as provide a means of getting at the reserve to use it up. My invention also makes the driver aware he is operating on reserve fuel. Therefore, it is an object of the present invention to provide a simple means of indicating fuel reserve.

It is another object to provide ready access to the reserve.

It is further object to provide a simple means of indicating fuel reserve that is readily attached and used with presently existing indicating and transferring fuel means.

The above brief description and objects will be more fully appreciated and understood by reference to the following detailed description of a preferred and illustrated embodiment of the present invention when taken in conjunction with the accompanying drawing.

The drawing shows an elevational view of a typical gas tank indicating unit and further shows the present invention in section connected thereto.

As shown in the drawing, an indicating or sensing unit 10 is attached in any convenient manner by conventional means such as bolts, rivets or the like, to a tank 12 such as an automobile fuel tank by means of a cover or mounting plate 14. A sealing gasket 16 prevents leaks at the mounting or cover area. The indicating unit has an outlet tube or discharge pipe 17 within the tank and an outlet discharge or outlet extension 18 outside the tank. A filter 20 is mounted on the discharge pipe adjacent the tank's bottom. Extension 18 is connected to the automobile's fuel pump through hose means which in turn supplies fuel to the auto's fuel pump.

Attached at some point below extension 18 along discharge pipe 17 is a float unit 22 that indicates the level of fluid in the tank which is conventionally done through gauges on the auto's instrument panel. As noted by the dotted line position 24 of float 26, any gauge connected to tank 12 would indicate that the tank was full and as noted by the full line position of the float would indicate the tank was empty. The unit as just described, is well known in the art as shown by U.S. Pat. No. 3,023,905 assigned to the same assignee.

Attached to discharge pipe 17 is a second sensing unit 30 which is the essence of my invention. Unit 30 is attached to pipe 17 within tank 12 by means of a clamp 32 or other similar holding means and is located at a level of liquid shown by line 31. Unit 30 comprises a body 34 having an orifice or opening 36 therein at one end which orifice is covered by a second filter 40. Orifice 36 in body 30 is connected to a second orifice or opening 38 in pipe 17 through a passage 37 in body 34. Passage 37 can be straight L-shaped as shown, or arranged in any convenient shape.

Within body 34 is a solenoid 41 made up of a core 42 and electromagnet 44. Core 42 has a valve 46 attached at one end and a float 48 attached to the other end thereof. The valve is constructed to close off the passage 37 leading from orifice 36 to the orifice 38 in outlet tube 17. There is also a set of permanent magnets 50 at the top of body 34 that retain the float in an upward position by means of a metal plate 52 attached to the top of the float. It is understood that spring means or the like could be used to retain the float to hold valve 46 open.

In operation, the indicating or outlet member 10 through appropriate gauges in the automobile, the use of which are well known in the art, will provide an indication of the amount of fuel in the tank and will also provide an indication when the fuel reaches the empty level. However, there will still be some reserve fuel in the tank as indicated by the line 31. At this point, the driver can activate pushbutton 54 to energize solenoid 41 so that valve 46 closes off passage 37. It is now readily apparent that the reserve fuel in the tank below line 33 can be used. A light may be used that would visually show that reserve fuel was being used. Filter 20 is located at the bottom of the outlet pipe to filter out any foreign particles that might be transferred out of the tank through pipe 17.

If the driver does not notice that his tank is on empty or has gone beyond the empty mark so that the fuel in the tank is below the passage 37, the vehicle will stall or sputter, etc. due to fuel starvation. The driver now knows that he should be on reserve fuel. At this point the driver activates pushbutton 54 to energize solenoid 41 to close off orifice 36 by means of valve 46 to allow the reserve fuel below passage 37 to be used. When the tank is filled once again, float 48 moves upwardly due to the level of rising fuel and deenergization of solenoid 41 and is held in the upward or open position by magnets 50. Spring means or the like could also be used.

I have provided a simple means of having a backup, low fuel indicating device that is necessary in these days of great distances of freeway travel, where it is useful that the operator of a vehicle be afforded a reserve fuel supply and further to require a positive response from the driver whereby he knows he is operating on the reserve fuel.

It will be understood that while the invention has been described with reference to specific embodiments thereof, various changes may be made within the full and intended scope of the claims which follow.

I claim:

1. In a liquid reserve indicating sensing and transferring mechanism in combination with a liquid holding tank, a discharge line mounted within said tank and having a first filter element at the end closest to the bottom of said tank, and a first liquid level sensing means positioned in said tank, the improvement comprising the addition of a sensing means on said discharge line a distance up from the bottom of the tank, said sensing means having a body member clamped to said discharge line, said body member having a passage therein that interconnects with an opening in the discharge line at one end, and a filter at the other end, valve means perpendicular to said passage in said body being connected to one end of a core member, magnet means surrounding said valve and core, and actuating means for energizing said magnet, whereby as the liquid in said tank reaches a low point, an indication is provided through said sensing means, by reason of fuel stoppage, at which time said magnet is activated through said actuating means to move the valve and close the passage within said body to permit the remainder of the liquid in said tank to be discharged through said first filter means.

2. In a liquid reserve indicating and transferring mechanism in combination with a liquid holding tank, a discharge line mounted within said tank having a filter element at the end closest to the bottom of said tank, and a first liquid level sensing means positioned in said tank, the improvement comprising a second liquid level sensing means positioned on said discharge line a distance up from the bottom of the tank, said second sensing means having a body member clamped to said discharge line, said body member having a passage therein with an orifice at one end that interconnects with an orifice in the discharge line and which has an intake orifice interconnecting with a filter at the other end, said intake orifice being positioned at a level in said tank between the level at which said first mentioned liquid sensing means would indicate an empty tank and the bottom of said tank, valve means in said body being connected to a core member and being normally retained in an open position, electromagnetic means surrounding said core, and actuating means for energizing said electromagnetic means whereby as the liquid in said tank reaches the level of said intake orifice, low fuel supply as indicated by said first mentioned liquid sensing means is reinforced by stoppage of fuel flow at which time said electromagnetic means is energized by said activating means to close the valve and the intake orifice within said body to permit the remainder of the liquid in said tank to be discharged through said first filter means.

3. The invention as set forth in claim 1, wherein said core member has a float thereon that will move in relation to said tank being filled to open said valve means.

4. The invention as set forth in claim 3 wherein said body member has permanent magnets therein and said float has metal means therein to attach to said permanent magnets, to hold said valve in the open position.

* * * * *